3,399,113
PROPAGATION OF ICH VIRUS IN SWINE-LUNG TISSUE CULTURE

Victor Jack Cabasso, Pearl River, N.Y., assignor to American Cyanamid Company, Stamford, Conn., a corporation of Maine
No Drawing. Filed Aug. 16, 1965, Ser. No. 480,189
3 Claims. (Cl. 195—1.3)

This invention relates to an improved method of preparing infectious canine hepatitis vaccine, which will be referred to throughout the specification as ICH, and to an improved ICH vaccine.

ICH has been a serious disease among dogs, particularly young dogs, and has resulted in many deaths. In general it affects the liver and kidneys of dogs but does not affect the lungs. An ICH virus was successfully grown and successively passed through cultures of canine kidney tissue, as described in an article by Cabasso et al. in the Proceedings of the Society for Experimental Biology and Medicine, vol. 85, pp. 239–245 (1954). An effective vaccine was produced which conferred immunity on vaccinated dogs, as described by Cabasso et al. in Proceedings of the Society for Experimental Biology and Medicine, vol. 99, pp. 46–51 (1958). However, the product had a practical drawback, namely, that although complete immunity was conferred on the vaccinated dog, for some time after vaccination the dog was capable of transmitting ICH to other susceptible dogs in contact with the vaccinated dog. In other words, the vaccinated dog was transformed, at least temporarily, into a carrier for ICH. This rendered the use of the vaccine unsuitable even though the ICH developed by susceptible contacts was usually mild and did not cause as many deaths as with fully virulent ICH street virus.

An improved process and an improved ICH vaccine was developed by passing the virus, after the required number of passages through dog kidney, usually about 24 or more, into swine kidney tissue cultures, preferably from young or embryonic swine in order to avoid possibility of contamination, although the vaccine was found to grow even in swine kidney tissue taken from adult swine. This improved method and improved vaccine was described by Cabasso in the journal above referred to in 1958. It was also described in the patent to Emery, No. 3,000,788, Sept. 19, 1961.

The improved ICH vaccine first modified in dog kidney tissue cultures and then further modified by passage through swine kidney tissue, preferably at least 9 or 10 passages, has been approved and is now available on the market. Although ICH vaccine described above modified first by passage through dog kidney tissue and then swine kidney tissue is effective and useful and does not transform the vaccinated dog into a carrier of reverted ICH virus, capable of transmitting ICH to susceptible contacts, there are certain drawbacks to the process, primarily economic in nature. The amount of swine kidney tissue from a particular slaughtered young pig or embryo is limited and for large scale vaccine production a relatively large number of young pigs are needed. This increases the cost of production substantially and thus is a real economic drawback.

The present invention relates to an improved modified ICH vaccine which can be produced more cheaply and which has all of the advantages of the dog kidney-porcine kidney vaccine described above. This has resulted from quite a surprising discovery, namely, that swine lung tissue, although not from an organ which in dogs is affected by ICH, can be used for the growth of modified ICH virus and production of vaccine therefrom, with the same advantages of removing the drawback of transforming a vaccinated dog into a carrier of reverted virus endangering susceptible contacts. This is all the more surprising because dog kidney modified ICH vaccine, or even the vaccine produced by first attenuation by passages through dog kidney tissue and then through porcine kidney tissue, appears to have no effect whatsoever when introduced into swine lung tissue cultures. No cytopathogenic lesions or other visible effects are observed.

According to the present invention the surprising result has been found that if serial passages of the ICH virus are effected through swine lung tissue, all of a sudden, usually on about the third or fourth passage, the virus begins to grow and after the fifth passage virus titers have reached a substantial maximum. Thus, for example, in a particular experiment using swine lung monolayer tissue cultures the virus could not be detected after the first passage and after the second passage. On the third passage the virus began to grow, reaching a titer of log 3.5. This increased to about log 6.5 after the fifth passage and remained high, finally reaching a limit slightly higher than log 7 after the eleventh passage. These figures are typical, as the exact figures will vary from one batch to another. It is not known why this anomalous and completely unexpected result took place after about the third passage through swine lung tissue culture, and it is not desired to limit the present invention to any theory of why suddenly after several passages through swine lung tissue the virus begins to grow. The result is completely reproducible even though the reasons or mechanisms for it are as yet not known.

The present invention permits a very marked saving in production cost of the vaccine without, in any way, adversely affecting its immunizing power or its freedom from the production of ICH in susceptible contacts of the vaccinated animals. While, as has been pointed out above, the new effect of delayed growth in swine lung tissue culture ordinarily occurs after about the third passage, we are dealing here, as always in processes of virus growth or vaccine production, with mechanisms which are not identical quantitatively in different batches. Accordingly, it is usually desirable to provide sufficient passages through swine lung tissue culture, for example more than five to eleven, so that good growth can be assured in each batch. Therefore, although the present invention in its broader aspects includes processes in which there have been at least three passages through swine lung tissue, in a more specific and preferred aspect the invention includes five or more passages.

It is an advantage of the present invention that the conditions for tissue culture do not have to be changed from more or less standard tissue culture conditions for virus growth or vaccine production. A typical set of conditions will be described in a specific example, but this is only illustrative and the invention is not limited to the exact details therein set forth. After all, the present invention is not one of changing the operating conditions of tissue culture processes but in the use of a number of passages through the unnatural, and normally considered unsuitable, swine lung tissue culture.

The inoculation of swine lung tissue monolayers from baby porcine lung tissue which has been grown in test tubes or bottles in the presence of a suitable growth medium, such as 0.5% lactalbumin hydrolysate in Earle's balanced salt solution with 10% calf serum, removed after a period of from 5 to 9 days growth and the medium replaced with a maintenance medium of the hydrolysate without serum, was with a virus which was initially isolated from a dog suffering from hepatitis as described in the 1954 Cabasso article above. This initial virus was cultivated in dog kidney monolayers for 24 consecutive passages and then in swine kidney monolayers for 35 consecutive passages, as described in the 1958 Cabasso article above referred to. The virus, or rather vaccine thus produced, was introduced into the swine lung monolayer culture described above and consecutively passed for 21 times. As described above, the initial passage through the swine lung tissue did not yield any measurable virus growth, nor did the second. It was only after the third passage that growth started and became progressively greater. The 21 passages referred to above are considerably more than the minimum needed, because after the eleventh passage the virus titer had reached log 7, which would be adequate for vaccine production. After each passage through the swine lung tissue the presence of the virus was established by inoculation into dog kidney monolayers where it showed its characteristic cytopathogenic effects. As stated above, no such effects were evident after the first or second passages in the swine lung tissue.

The effectiveness of the vaccine prepared according to the present invention as described in the specific illustrative example above was determined by injecting the vaccine after the tenth swine lung tissue culture passage into dogs. Two concentrations were used, one undiluted infected tissue culture fluid and the other diluted fluid 1 to 50 with saline solution. Three susceptible dogs were given 2 ml. of the undiluted culture and three susceptible dogs the same amount of the diluted culture. The dogs were observed for 21 days, and all six dogs remained free from symptoms of hepatitis and all maintained body temperatures within the normal range. The susceptibility of the dogs was demonstrated by negative serum neutralization titers against ICH virus. After inoculation all six dogs developed high titers of ICH antibodies at two and four weeks, as shown in the accompanying table.

TABLE I.—ANTIGENICITY AND SAFETY TESTS IN DOGS OF ICH VIRUS TC ORIGIN TISSUE CULTURE PASS. DK24-SK35-SL10 EXPT. NO. 8236B-186

[Post-inoculation daily temperature record in ° F.]

| Days After Inoculation | Virus Dilution—No. TCID50 per 2.0 ml. dose—Dog No. | | | | | |
|---|---|---|---|---|---|---|
| | Undilute: 31,630,000 | | | 1:50 Dilution: 632,400 | | |
| | 398 | 399 | 400 | 401 | 402 | 403 |
| 1 | 2.4 | 2.6 | 2.4 | 2.2 | 2.0 | 1.8 |
| 2 | 2.4 | 2.6 | 2.6 | 2.8 | 2.2 | 2.2 |
| 3 | 1.4 | 2.0 | 1.6 | 1.4 | 2.6 | 1.2 |
| 4 | | | | | | |
| 5 | 1.4 | 1.8 | 1.6 | 2.0 | 2.0 | 2.4 |
| 6 | 1.2 | 2.0 | 2.0 | 1.6 | 1.6 | 1.8 |
| 7 | 1.2 | 1.0 | 1.4 | 1.2 | 1.4 | 1.4 |
| 8 | 1.8 | 1.8 | 1.4 | 2.2 | 1.2 | 1.6 |
| 9 | 1.2 | 1.4 | 1.0 | 1.4 | 1.0 | 1.0 |
| 10 | 1.6 | 1.4 | 1.0 | 1.6 | 1.4 | 1.0 |
| 11 | | | | | | |
| 12 | 1.6 | 2.4 | 1.6 | 1.0 | 1.8 | 2.0 |
| 13 | 1.8 | 2.8 | 2.2 | 2.2 | 2.0 | 2.2 |
| 14 | 1.2 | 1.6 | 2.0 | 2.4 | 1.8 | 2.4 |
| 15 | 1.2 | 1.0 | 2.0 | 1.0 | 1.4 | 1.2 |
| 16 | 1.8 | 2.0 | 2.2 | 2.4 | 2.4 | 2.6 |
| 17 | 1.6 | 2.0 | 2.2 | 2.6 | 1.2 | 2.2 |
| 18 | | | | | | |
| 19 | 1.4 | 1.2 | 1.0 | 2.4 | 1.8 | 1.6 |
| 20 | 1.4 | 1.8 | 2.0 | 2.0 | 1.4 | 1.0 |
| 21 | 1.6 | 1.2 | 1.4 | 2.0 | 1.8 | 2.4 |

RESULTS OF ICH NEUTRALIZATION TESTS ON SERA FROM DOGS INOCULATED WITH ICH VIRUS: T.C. PASS. DK24-SK35-SL10

| Dog No. | Dilution of virus inoculated | Pre-inoc. | ICH/SN/50 Titer per 0.1 ml. | |
|---|---|---|---|---|
| | | | 2 wks. post | 4 wks. post |
| 398 | 2.0 ml. Undilute | <1:4 | 1:45 | 1:512 |
| 399 | do | <1:4 | 1:360 | 1:712 |
| 400 | do | <1:4 | 1:128 | 1:712 |
| 401 | 2.0 ml. 1:50 dilution | <1:4 | 1:180 | 1:2048 |
| 402 | do | <1:4 | 1:180 | 1:512 |
| 403 | do | <1:4 | 1:45 | 1:712 |

The vaccinated dogs developed sufficient ICH antibodies to be immune on challenge and no reverted virus carrier effect with susceptible contacts was noted.

It will be seen that the present invention produced a vaccine having all of the desirable features of the dog kidney-porcine kidney vaccines produced before but by the new, cheaper and more efficient process. It is not known why the serial growths through the lung tissue, representing an organ which is not a target for ICH in dogs, failed to affect adversely the properties of the vaccine, and of course there is no knowledge of why this result occurred, and it is not desired to limit the invention to any theory of action.

I claim:

1. A method for preparing infectious canine hepatitis vaccine which comprises the steps of consecutive serial passage of ICH virus isolated from a dog suffering from hepatitis through dog kidney tissue culture for about 24 consecutive passages and then in swine kidney tissue for about 35 consecutive passages until the virus became avirulent for dogs but retained full antigenicity for the production of antibodies in susceptible animals, and then serial passage of the ICH vaccine through at least three consecutive further serial passages in swine lung tissue.

2. A process according to claim 1 in which the serial passages through swine lung tissue culture amounted to at least five.

3. An infectious canine hepatitis vaccine rendered avirulent to susceptible dogs but retaining antigenicity prepared by about 24 consecutive serial passages through dog kidney tissue and then about 35 consecutive serial passages through swine kidney tissue and by at least three consecutive further serial passages through swine lung tissue, said vaccine being free from reverted virus carrier effects when inoculated into susceptible dogs who are associated with susceptible contacts, produced in accordance with claim 1.

References Cited

UNITED STATES PATENTS 2,915,436  12/1959  Fieldsteel _____ 167—78
3,000,788   9/1961  Emery _____ 167—78

LEWIS GOTTS, *Primary Examiner.*

S. K. ROSE, *Assistant Examiner.*